(12) United States Patent
Peso Parada et al.

(10) Patent No.: US 11,828,885 B2
(45) Date of Patent: Nov. 28, 2023

(54) PROXIMITY SENSING

(71) Applicant: Cirrus Logic International Semiconductor Ltd., Edinburgh (GB)

(72) Inventors: Pablo Peso Parada, Edinburgh (GB); Rahim Saeidi, Surrey (GB)

(73) Assignee: Cirrus Logic Inc., Austin, TX (US)

(*) Notice: Subject to any disclaimer, the term of this patent is extended or adjusted under 35 U.S.C. 154(b) by 876 days.

(21) Appl. No.: 16/219,120

(22) Filed: Dec. 13, 2018

(65) Prior Publication Data
US 2019/0187261 A1 Jun. 20, 2019

Related U.S. Application Data

(60) Provisional application No. 62/599,076, filed on Dec. 15, 2017.

(30) Foreign Application Priority Data

Mar. 15, 2018 (GB) ..................................... 1804129

(51) Int. Cl.
*G01S 7/521* (2006.01)
*G10K 9/12* (2006.01)
(Continued)

(52) U.S. Cl.
CPC .............. *G01S 7/521* (2013.01); *G01N 29/34* (2013.01); *G01S 7/523* (2013.01); *G01S 7/539* (2013.01);
(Continued)

(58) Field of Classification Search
None
See application file for complete search history.

(56) References Cited

U.S. PATENT DOCUMENTS 4,600,815 A * 7/1986 Horna .................... H04M 9/082
379/390.01
5,367,614 A * 11/1994 Bisey ...................... G01S 5/186
345/156
(Continued)

FOREIGN PATENT DOCUMENTS

WO 2016063530 A1 4/2016

OTHER PUBLICATIONS

Zammit, Olivier, Xavier Descombes, and Josiane Zerubia. "Combining one-class support vector machines and hysteresis thresholding: application to burnt area mapping." 2008 16th European Signal Processing Conference. IEEE, 2008. (Year: 2008).*
(Continued)

*Primary Examiner* — Isam A Alsomiri
*Assistant Examiner* — Jonathan D Armstrong
(74) *Attorney, Agent, or Firm* — Jackson Walker L.L.P

(57) ABSTRACT

Embodiments of the present disclosure provide apparatus, methods and computer programs for ultrasonic proximity-detection. In one embodiment, processing circuitry comprises: a first input for receiving an indication of an interrogating ultrasonic signal; a second input for receiving a detected ultrasonic return signal; an adaptive filter, coupled to the first and second inputs, operative to estimate a transfer function between the interrogating ultrasonic signal and the detected ultrasonic return signal; a feature extract module, coupled to the adaptive filter, operative to calculate statistical moments of one or more of: the estimated transfer function; an estimated ultrasonic return signal, calculated based on the interrogating ultrasonic signal and the estimated transfer function; and an error signal, representing the error between the estimated ultrasonic return signal and the detected ultrasonic return signal; and a classifier module, coupled to the feature extract module, operative to determine
(Continued)

the presence of a nearby object based on the statistical moments.

20 Claims, 3 Drawing Sheets

(51) Int. Cl.
| | |
|---|---|
| G01S 7/523 | (2006.01) |
| H04B 11/00 | (2006.01) |
| G01N 29/34 | (2006.01) |
| G01S 15/04 | (2006.01) |
| G01S 15/10 | (2006.01) |
| G01S 7/539 | (2006.01) |
| G01S 15/08 | (2006.01) |
| G01S 7/52 | (2006.01) |
| G01S 7/527 | (2006.01) |

(52) U.S. Cl.
CPC ............ *G01S 15/04* (2013.01); *G01S 15/104* (2013.01); *G10K 9/12* (2013.01); *H04B 11/00* (2013.01); *G01S 7/52004* (2013.01); *G01S 7/527* (2013.01); *G01S 15/08* (2013.01)

(56) References Cited

U.S. PATENT DOCUMENTS

| | | | | |
|---|---|---|---|---|
| 6,104,808 | A * | 8/2000 | Alameh | H04M 1/0214 379/433.02 |
| 6,314,055 | B1 * | 11/2001 | Foxlin | G01S 7/523 367/127 |
| 6,323,661 | B1 * | 11/2001 | Wildes | G01N 27/041 324/715 |
| 6,404,886 | B1 * | 6/2002 | Yoshida | H04M 9/082 379/406.01 |
| 6,542,436 | B1 * | 4/2003 | Myllyla | G01S 7/527 340/686.6 |
| 7,016,504 | B1 * | 3/2006 | Shennib | A61B 5/121 381/60 |
| 8,401,513 | B2 * | 3/2013 | Langereis | G01S 15/06 455/401 |
| 9,305,541 | B2 * | 4/2016 | Caillet | B60N 2/879 |
| 9,324,311 | B1 * | 4/2016 | Abdollahzadeh Milani | G10K 11/17823 |
| 9,369,798 | B1 * | 6/2016 | Alderson | G10K 11/17857 |
| 9,392,364 | B1 * | 7/2016 | Milani | H04R 3/002 |
| 9,478,212 | B1 * | 10/2016 | Sorensen | G10K 11/17817 |
| 9,529,428 | B1 * | 12/2016 | Bhattacharya | G06F 3/0304 |
| 9,578,415 | B1 * | 2/2017 | Zhou | H04R 3/002 |
| 9,578,432 | B1 * | 2/2017 | Abdollahzadeh Milani | H04R 3/002 |
| 9,620,101 | B1 * | 4/2017 | Thandri | H02M 3/07 |
| 9,832,452 | B1 * | 11/2017 | Fotland | G01S 3/00 |
| 10,317,528 | B2 * | 6/2019 | Curtis | G01S 15/08 |
| 10,352,853 | B2 * | 7/2019 | Shiono | A61B 5/4064 |
| 10,361,802 | B1 * | 7/2019 | Hoffberg-Borghesani | G11B 27/11 |
| 10,714,072 | B1 * | 7/2020 | Bodon | H04R 1/1041 |
| 10,942,252 | B2 * | 3/2021 | Chen | A63F 13/212 |
| 2002/0068537 | A1 * | 6/2002 | Shim | H04M 1/605 455/177.1 |
| 2004/0225904 | A1 * | 11/2004 | Perez | H04W 52/027 713/320 |
| 2005/0015009 | A1 * | 1/2005 | Mourad | A61B 5/7267 600/438 |
| 2005/0046584 | A1 | 3/2005 | Breed | |
| 2005/0219211 | A1 * | 10/2005 | Kotzin | G06F 1/1684 345/158 |
| 2005/0219223 | A1 * | 10/2005 | Kotzin | G06F 3/0481 345/173 |
| 2005/0219228 | A1 * | 10/2005 | Alameh | G06F 3/0488 345/173 |
| 2006/0029233 | A1 * | 2/2006 | Sommerfeldt | G10K 11/17817 381/71.7 |
| 2006/0062380 | A1 * | 3/2006 | Kim | H04M 9/082 379/406.01 |
| 2006/0098810 | A1 * | 5/2006 | Kim | H04M 9/082 379/406.14 |
| 2008/0144853 | A1 | 6/2008 | Sommerfeldt et al. | |
| 2008/0224863 | A1 | 9/2008 | Bachmann | |
| 2009/0149038 | A1 * | 6/2009 | Gabara | H01L 24/95 439/55 |
| 2010/0080084 | A1 * | 4/2010 | Chen | H04M 1/6008 367/118 |
| 2010/0125816 | A1 * | 5/2010 | Bezos | G06F 3/013 715/863 |
| 2010/0138680 | A1 * | 6/2010 | Brisebois | G06F 1/3231 713/324 |
| 2010/0328319 | A1 * | 12/2010 | Ikenoue | A63F 13/211 345/474 |
| 2011/0003615 | A1 * | 1/2011 | Langereis | G01S 15/04 455/556.1 |
| 2011/0116644 | A1 * | 5/2011 | Beaugeant | H04M 9/082 381/66 |
| 2011/0222698 | A1 * | 9/2011 | Asao | G10K 11/17881 381/71.1 |
| 2012/0140943 | A1 * | 6/2012 | Hendrix | G10K 11/17885 381/71.11 |
| 2012/0254631 | A1 * | 10/2012 | Skillman | G06F 1/3203 713/300 |
| 2012/0286943 | A1 * | 11/2012 | Rothkopf | G08B 6/00 340/407.1 |
| 2012/0308021 | A1 * | 12/2012 | Kwatra | G10K 11/17885 381/71.1 |
| 2012/0308025 | A1 * | 12/2012 | Hendrix | G10K 11/17827 381/71.11 |
| 2012/0308026 | A1 * | 12/2012 | Kamath | G10K 11/17817 381/71.11 |
| 2012/0308028 | A1 * | 12/2012 | Kwatra | H04R 1/1083 381/71.11 |
| 2012/0310640 | A1 * | 12/2012 | Kwatra | G10K 11/17855 704/233 |
| 2013/0244731 | A1 * | 9/2013 | Oishi | H04M 1/0266 455/566 |
| 2013/0301846 | A1 * | 11/2013 | Alderson | G10K 11/17827 381/71.7 |
| 2014/0010376 | A1 * | 1/2014 | Veluppillai | H03G 1/00 381/57 |
| 2014/0085201 | A1 * | 3/2014 | Carmel-Veilleux | G06F 3/011 345/158 |
| 2014/0098063 | A1 * | 4/2014 | Rojas | H04M 1/67 345/175 |
| 2014/0125193 | A1 * | 5/2014 | Chowdhury | B06B 1/0292 310/300 |
| 2015/0256928 | A1 * | 9/2015 | Mizuno | G01S 15/325 381/56 |
| 2015/0256953 | A1 * | 9/2015 | Kwatra | H04R 5/04 381/58 |
| 2015/0277631 | A1 * | 10/2015 | Oishi | G06F 3/0446 345/174 |
| 2015/0365761 | A1 * | 12/2015 | Alderson | G10K 11/17881 381/71.6 |
| 2016/0044394 | A1 * | 2/2016 | Derom | G01S 15/04 367/95 |
| 2016/0112817 | A1 * | 4/2016 | Fan | H04R 29/004 381/94.7 |
| 2016/0156761 | A1 * | 6/2016 | Beaurepaire | G10L 25/78 455/414.1 |
| 2016/0180830 | A1 * | 6/2016 | Lu | G10K 11/17875 381/71.6 |
| 2016/0211876 | A1 * | 7/2016 | Yamamoto | H04B 1/3838 |
| 2016/0365084 | A1 * | 12/2016 | Alderson | G10K 11/17857 |
| 2017/0032806 | A1 * | 2/2017 | Konjeti | G10L 25/84 |
| 2017/0053639 | A1 * | 2/2017 | Lu | G10K 11/17857 |
| 2017/0084263 | A1 * | 3/2017 | Hendrix | G10K 11/17854 |
| 2017/0133000 | A1 * | 5/2017 | Hendrix | G10K 11/17854 |
| 2017/0214994 | A1 * | 7/2017 | Gadonniex | H04R 1/105 |
| 2017/0256248 | A1 * | 9/2017 | Alderson | G10K 11/17881 |

(56) References Cited

U.S. PATENT DOCUMENTS

| | | | |
|---|---|---|---|
| 2017/0270906 A1* | 9/2017 | Kwatra | H04R 3/12 |
| 2018/0091892 A1* | 3/2018 | Taylor | H04R 1/2811 |
| 2018/0124255 A1* | 5/2018 | Kawamura | H04M 1/724 |
| 2018/0124256 A1* | 5/2018 | Kawamura | H04M 19/04 |
| 2018/0308465 A1* | 10/2018 | Zhou | G10K 11/178 |
| 2018/0323783 A1* | 11/2018 | Bang | G01S 7/521 |
| 2018/0367662 A1* | 12/2018 | Kawamura | H04M 1/72454 |
| 2019/0043467 A1* | 2/2019 | Zhou | H04R 3/00 |
| 2019/0050061 A1* | 2/2019 | Borstad | G01S 15/523 |
| 2019/0052962 A1* | 2/2019 | Abe | H04R 3/14 |
| 2019/0103090 A1* | 4/2019 | Cho | G10K 11/17881 |
| 2019/0237058 A1* | 8/2019 | Vogel | G10K 11/17855 |
| 2019/0277966 A1* | 9/2019 | Schoessler | H04M 1/72454 |
| 2019/0302916 A1* | 10/2019 | Thomas | G06F 3/043 |
| 2020/0005759 A1* | 1/2020 | Alderson | G10K 11/17857 |
| 2020/0058285 A1* | 2/2020 | Parikh | G10K 11/17833 |
| 2020/0092647 A1* | 3/2020 | Palmer | H04R 25/407 |
| 2020/0184278 A1* | 6/2020 | Zadeh | G06F 16/953 |
| 2020/0294521 A1* | 9/2020 | Chen | G02C 11/06 |
| 2020/0312346 A1* | 10/2020 | Fazeli | G06N 3/10 |
| 2020/0364854 A1* | 11/2020 | Fedewa | G06T 7/0012 |
| 2021/0014600 A1* | 1/2021 | Neumaier | G01S 15/04 |
| 2021/0058505 A1* | 2/2021 | Gorsica | G06F 3/167 |
| 2021/0217401 A1* | 7/2021 | Christian | G10K 11/17813 |

OTHER PUBLICATIONS

Bansal, Aakash, et al. "Micro activity recognition of mobile phone users using inbuilt sensors." 2018 8th International Conference on Cloud Computing, Data Science & Engineering (Confluence). IEEE, Date of Conference Jan. 11-12, 2018. (Year: 2018).*

Cohen, Zacharie, et al. "Acoustics Based Proximity Detector for Mobile Phones." 2020 IEEE Workshop on Signal Processing Systems (SiPS). IEEE, 2020. (Year: 2020).*

Parada, Pablo Peso, and Rahim Saeidi. "Ultrasonic based proximity detection for handsets." 2018 26th European Signal Processing Conference (EUSIPCO). IEEE, 2018. (Year: 2018).*

Pullano, Salvatore A., et al. "Obstacle detection system based on low quality factor ultrasonic transducers for medical devices." 2016 IEEE International Symposium on Medical Measurements and Applications (MeMeA). IEEE, 2016. (Year: 2016).*

Miao, Fen, et al. "Identifying typical physical activity on smartphone with varying positions and orientations." Biomedical engineering online 14.1 (2015): 1-15. (Year: 2015).*

Pazaitis, Dimitrios I., and Anthony G. Constantinides. "A novel kurtosis driven variable step-size adaptive algorithm." IEEE Transactions on Signal Processing 47.3 (1999): 864-872. (Year: 1999).*

Combined Search and Examination Report under Sections 17 and 18(3), UKIPO, Application No. GB1804129.3, dated Sep. 17, 2018.

* cited by examiner

PROXIMITY SENSING

TECHNICAL FIELD

Embodiments of the present disclosure relate to proximity sensing, and particularly to the use of ultrasonic transducers for proximity sensing.

BACKGROUND

Proximity sensing is a well-known function enabling a device to detect the presence of nearby objects without physical contact. Many different techniques exist for proximity detection, and a significant number of those techniques involve the generation of an interrogating signal, and the detection of changes in the field or return signal. The return signal may comprise a component resulting from reflection off a nearby object, with the time between generation of the interrogating signal and detection of the reflected response giving an indication of the distance between the sensor and the object. One famous use of this principle is radar, which involves the generation of an interrogating electromagnetic radio signal and the detection of reflected radio waves.

Modern handheld electronic devices also make use of proximity sensors. For example, smart phones and the like typically provide a touchscreen for user input, which covers a significant percentage of the front face of the device. When the user holds the device close to their ear, for a call or any other purpose, proximity sensors in the device can be used to detect the proximity of the user's ear (or more generally the user's head) and lock the touchscreen to touch input. In this way, accidental input from touches by the user's ear are blocked, and undesired commands via the touchscreen are avoided.

Currently, proximity sensing is performed by an infrared sensor in the front face of the electronic device, which generates an outgoing infrared signal, and detects changes in the field or return signal as described above. However, this limits the design options of electronic device, as a separate infrared proximity sensor must be provided. This is located in the bezel which surrounds the touchscreen, and designers of touchscreen devices are increasingly seeking to reduce the size of the bezel in order to maximize the space available on the front face for the screen. Thus the presence of the infrared proximity sensor places a limit on the percentage of the front face which can be devoted to the screen. An alternative proximity sensing solution is therefore required.

Ultrasonic transducers have been proposed as a solution for proximity detection in electronic devices. However, these devices present their own problems. Handheld electronic devices are typically used in noisy environments, and it is important that an ultrasonic proximity sensor is robust to such noise. For example, it is expected that users will interact with their device by tapping on a touchscreen, or even physical buttons provided in the device. The electronic device may be handled roughly, resulting in bumps and other sudden accelerations. Each of these sources of noise may be known as "impulsive noise". Acoustic noise in the environment may also be sensed by an ultrasonic sensor. Some or all of these sources of noise can affect the correct functioning of ultrasonic-based proximity-sensing. If the performance of the ultrasonic proximity detection is to match that of infrared proximity detection, it is important for the ultrasonic system to operate correctly in such noisy environments.

SUMMARY

A first aspect of the present disclosure provides processing circuitry for ultrasonic proximity-detection. The processing circuitry comprises: a first input for receiving an indication of an interrogating ultrasonic signal; a second input for receiving a detected ultrasonic return signal; an adaptive filter, coupled to the first and second inputs, operative to estimate a transfer function between the interrogating ultrasonic signal and the detected ultrasonic return signal; a feature extract module, coupled to the adaptive filter, operative to calculate statistical moments of one or more of: the estimated transfer function; an estimated ultrasonic return signal, calculated based on the interrogating ultrasonic signal and the estimated transfer function; and an error signal, representing the error between the estimated ultrasonic return signal and the detected ultrasonic return signal; and a classifier module, coupled to the feature extract module, operative to determine the presence of a nearby object based on the statistical moments.

The processing circuitry may be provided in an electronic device, additionally comprising one or more ultrasonic transducers, coupled to the processing circuitry, operative to generate the interrogating ultrasonic signal and to detect the ultrasonic return signal.

A further aspect of the disclosure provides a method of performing proximity detection, comprising: receiving an indication of an interrogating ultrasonic signal; receiving a detected ultrasonic return signal; estimating a transfer function between the interrogating ultrasonic signal and the detected ultrasonic return signal; calculating statistical moments of one or more of: the estimated transfer function; an estimated ultrasonic return signal, calculated based on the interrogating ultrasonic signal and the estimated transfer function; and an error signal, representing the error between the estimated ultrasonic return signal and the detected ultrasonic return signal; and determining the presence of a nearby object based on the statistical moments.

The disclosure also provides a computer program product, comprising a non-transitory machine-readable medium containing instructions which, when executed by processing circuitry, cause the processing circuitry to perform the method recited above.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Terms such as "first", "second" etc. may be used herein as labels to distinguish between features which are otherwise similar, unless the context otherwise dictates. In particular, in the present disclosure, references to first, second, third and fourth statistical moments instead describe the "first moment", "second moment", and so on, in a mathematical sense. In the present context, the first statistical moment of a collection of data samples may be considered as the mean value of those data samples, the second statistical moment of a collection of data samples may be considered as the variance of those data samples, the third statistical moment of a collection of data samples may be considered as the skewness of those data samples, and the fourth statistical moment of a collection of data samples may be considered as the kurtosis of those data samples.

Figure 1:
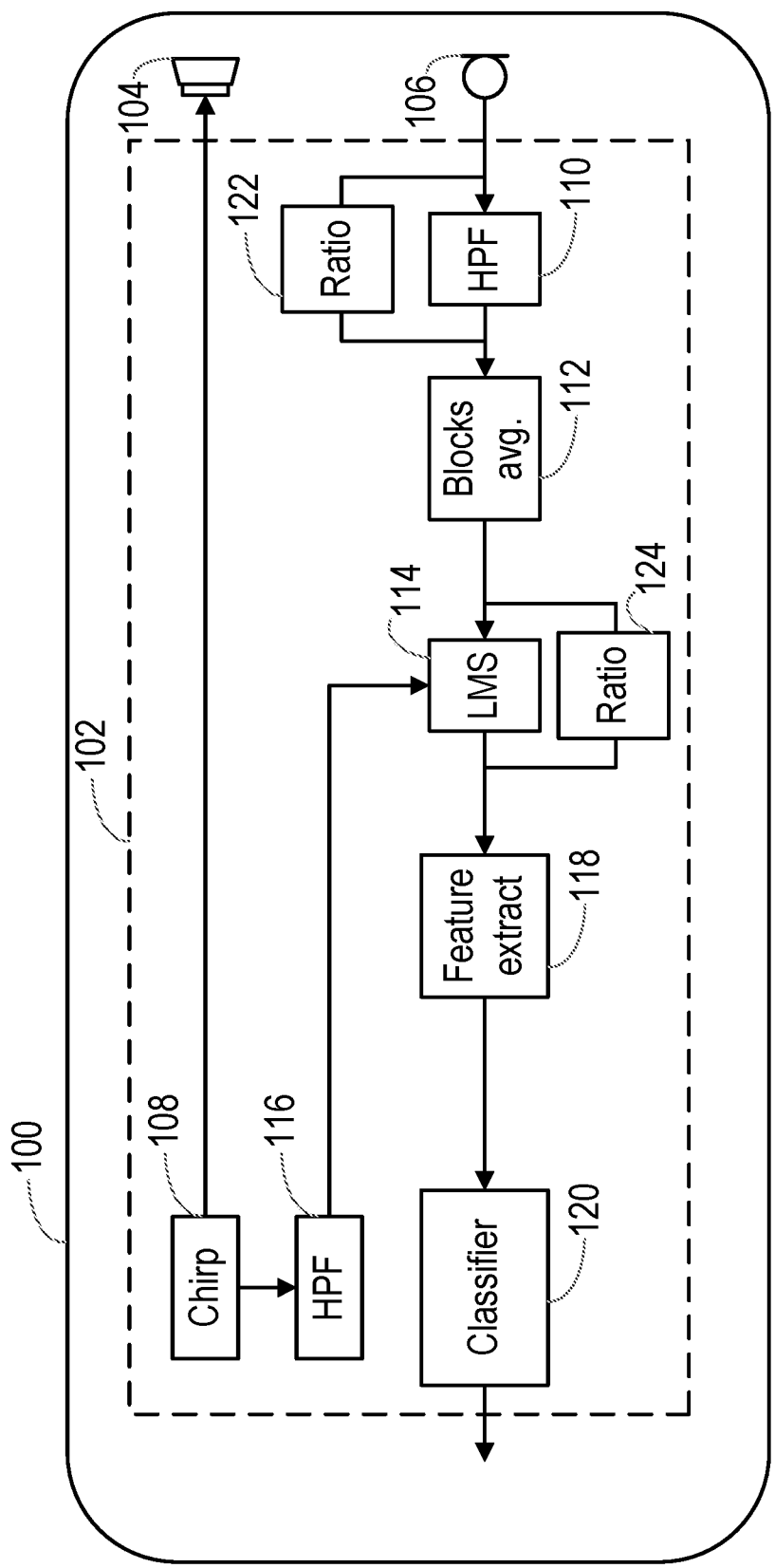
FIG. 1 is a schematic diagram of an electronic device comprising processing circuitry according to embodiments of the disclosure.

FIG. 1 is a schematic diagram of an electronic device 100 comprising processing circuitry 102 according to embodiments of the disclosure. The electronic device 100 may be any suitable device which may require, or make use of, proximity detection (e.g. a motion sensor). In one embodiment, the device 100 may be a handheld or mobile device, such as smartphone, camera, monitor, laptop or tablet computer, games console, or games console peripheral device. The processing circuitry 102 may be provided on a single integrated circuit or chip, or may be distributed across multiple integrated circuits.

Proximity detection may comprise, at a basic level, detecting the presence or absence of an object which is near the electronic device 100. Parameters may be set within the processing circuitry 102, as will be described below, so as to detect the presence of an object within a given distance of the device 100. The distance at which detection occurs may be varied in accordance with the design requirements. Thus, the output of the proximity detection may be a binary decision indicating the presence or absence of a nearby object. Alternatively or additionally, proximity detection may comprise measurement of the distance between the electronic device 100 and any nearby objects, e.g., based on a measured round-trip time between the emitted interrogating signal and the detected reflected signal. The output of the proximity detection in this case may be an indication of the distance between the electronic device 100 (or rather the proximity detection system within the device 100) and the nearby object. Still further, proximity detection may comprise measurement of the distance between the electronic device 100 and different parts of a nearby object, so as to detect an orientation of the object with respect to the electronic device 100. This latter embodiment entails the highest processing complexity, but may be used, for example, for gesture recognition and consequential user input to the electronic device 100. Embodiments of the present disclosure are relevant to each of these methods.

The electronic device 100 further comprises a loudspeaker 104 and a microphone 106, both coupled to the processing circuitry 102. In the illustrated embodiment, the loudspeaker 104 is operative to output an interrogating ultrasonic signal, and the microphone 106 is operative to detect an ultrasonic return signal (e.g. as reflected from a nearby object). It will be understood by those skilled in the art that loudspeakers and microphones have similar components for the generation and detection of acoustic or ultrasonic signals. In the former case, the loudspeaker is driven by an electronic signal to output an acoustic or ultrasonic signal; in the latter case, the microphone is driven by an acoustic or ultrasonic signal to output an electronic signal. The term "ultrasonic transducer" is used herein to describe any device which is capable of generating or detecting an ultrasonic signal.

In embodiments where the electronic device 100 is a smartphone, the loudspeaker 104 may comprise an earpiece, used in a normal mode to output an audio signal (such as a voice signal) while the user is on a call. The microphone 106 may comprise a "top microphone" (i.e. arranged at or near the top of the smartphone), and conventionally used for the detection of sounds in the environment of the device 100. Alternatively, the microphone 106 may comprise an error microphone, positioned at or close to the loudspeaker 104, and used for the purposes of feedback active noise cancellation. In each of these embodiments, physical components of the device 100 which are already present in the device for other purposes may be re-purposed for ultrasonic proximity-detection. Thus, additional dedicated sensors may not be required, and real-estate on the front face of the device 100 can be used for other purposes, such as the screen.

The discussion above and the illustrated embodiment assumes the use of separate physical components for the generation of the interrogating ultrasonic signal and the detection of the ultrasonic return signal. In other embodiments, however, the same ultrasonic transducer may be used for both signal generation and signal detection. For example, the transducer may be time-multiplexed between signal generation and signal detection. In one particular example, a screen of the electronic device 100 may be re-purposed for the generation and/or detection of ultrasonic signals, e.g., through the use of piezoelectric or other high-speed actuators coupled to the screen—either driven to generate ultrasonic signals, or non-driven to detect incoming ultrasonic signals.

The processing circuitry 102 comprises a chirp module 108, coupled to the speaker 104. The chirp module 108 is operative to generate a chirp, pulse or any other ultrasonic signal (e.g., single tones, dual-tones, multi-tones, etc.) and output the signal to the speaker 104 to be output from the device 100. The output signal may comprise a plurality of consecutive samples at an output frequency which is above the limit of human hearing.

In one particular example, where the output signal is a chirp, the signal may comprise 4096 samples at a sampling frequency of 96 kHz, and a waveform ramping between first and second ultrasonic frequencies (e.g. from 25 kHz to 35 kHz). Multiple such chirps may be generated by the chirp module 108 and transmitted by the speaker 104 in succession or concurrently.

In one embodiment, the ultrasonic output signal may be output simultaneously with an audio signal (e.g. a voice signal while the user is on a call).

The interrogating ultrasonic signal is thus output from the device 100 by the speaker 104. An ultrasonic return signal is detected by the microphone 106, and the detected signal is passed to the processing circuitry 102. The detected return signal is input to a high-pass filter 110, to remove low-frequency noise from the signal. It will be appreciated that the band of interest in this context is an ultrasonic frequency band, and thus the high-pass filter 110 may filter signals below (or significantly below) the transmission frequency of the interrogating ultrasonic signal. For example, where the frequency is between 25 and 35 kHz (as with the chirp described above), the cut-off frequency of the high-pass filter 110 may be set at or around 20 kHz. It will be understood by those skilled in the art that the precise cut-off frequency of the high-pass filter 110 may be determined by a designer of the proximity-detection system in accordance with the needs of the system.

The filtered signal is output from the high-pass filter 110 to an averaging module 112, which averages data samples in the signal in order to reduce noise further, and enhance the desired signal (e.g., the reflection of the interrogating ultrasonic signal). The return signal may be captured in consecutive blocks of samples, with each block comprising a plurality of data samples. In one embodiment, each block comprises the same number of data samples as the ultrasonic output signal (i.e., in the chirp example above, 4096 samples), such that each data block comprises one chirp or pulse at most. The averaging module 112 may be operative to average a plurality of consecutive blocks of samples (e.g., two blocks).

The block-averaged return signal is output from the averaging module 112 to an adaptive filter 114. In one embodiment, the adaptive filter 114 is a least-mean-squares (LMS) filter, i.e. an adaptive filter that employs a LMS adaptation algorithm. The adaptive filter is further operative to receive an indication of the ultrasonic interrogating signal. In the illustrated embodiment, the indication of the ultrasonic interrogating signal is received from a high-pass filter 116, which is coupled to the chirp module 108. The high-pass filter 116 receives the ultrasonic output signal from the chirp module 108, and applies a high-pass filter with the same cut-off frequency as the high-pass filter 110 which acts on the detected ultrasonic return signal. The high-pass filter 116 thus applies the same processing to the output signal as the high-pass filter 110 applies to the detected signal.

The adaptive filter 114 is operative to determine or estimate the transfer function (e.g., the acoustic transfer function) between the transducers emitting and receiving the ultrasonic signal.

Figure 2:
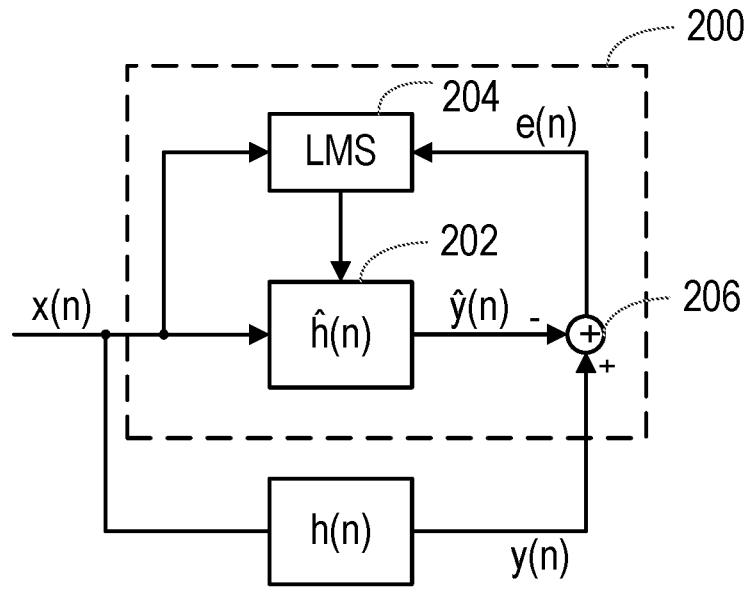
FIG. 2 is a schematic illustration of an adaptive filter according to embodiments of the disclosure.

FIG. 2 is a schematic illustration of an adaptive filter 200 according to embodiments of the disclosure. The adaptive filter 200 may be implemented as the adaptive filter 114 described above with respect to FIG. 1. The adaptive filter 200 comprises a filter 202 (which may be a finite impulse response (FIR) filter), an adaptation module 204, and an add/subtract module 206.

The acoustic transfer function from the speaker 104 to the microphone 106 provides information about how the transmitted signal was modified in order to receive the signal y(n), assuming no external noise sources are present. It therefore provides information of the properties of the acoustic path between the transmitted signal and the detected signal, which can be indicative of nearby objects.

As used herein, x(n) is the transmitted output signal corresponding to the nth block (e.g., a vector comprising a set of samples with length equal to the block size), y(n) is the detected return signal for the nth block (e.g. a vector comprising a set of samples with length equal to the block size), h(n) is the transfer function, and $\hat{h}(n)$ and h(n) are the estimates of the detected return signal and the transfer function respectively (e.g., in the latter case, a vector comprising a set of coefficients of the FIR filter 202).

It can be seen from FIG. 2 that the acoustic transfer function h(n) acts on the transmitted signal to result in the detected return signal y(n). It is an objective of the adaptive filter 200 to estimate the transfer function, and thus minimize an error signal e(n) representing the difference between the detected return signal and the estimated return signal (where e(n) may also comprise a vector having a length equal to the block size):

$$e(n) = y(n) - \hat{y}(n)$$
$$= y(n) - x(n) \cdot \hat{h}(n)$$

In particular, when implemented as a LMS filter, the filter 200 may seek to minimize the mean squared error:

$$E\{e^2(n)\}$$

The filter 202 may comprise a finite impulse response (FIR) filter, with a plurality of taps, operative to apply the estimated transfer function to the output signal x(n). The adaptation module 204 may seek to minimize one or more of the error, the mean squared error or any other suitable metric (such as Kullback-Leibler divergence), by updating the taps of the filter 202 as new data blocks are received.

Returning to FIG. 1, the adaptive filter 114 thus outputs one or more signals to a feature extract module 118. The output signals may comprise one or more of: the estimated transfer function $\hat{h}(n)$; the estimated ultrasonic return signal $\hat{y}(n)$; and the error signal e(n). In one embodiment, each of these three signals is output from the adaptive filter 114 to the feature extract module 118.

The feature extract module 118 is operative to calculate, for the nth data block, one or more statistical moments for one or more of the estimated transfer function $\hat{h}(n)$; the estimated ultrasonic return signal $\hat{y}(n)$; and the error signal e(n). In one embodiment, the feature extract module is operative to calculate one or more statistical moments in respect of each of those signals. Thus the amplitude distribution of the samples of a given block (where the block may have length 4096 samples, as per the example above) is analysed statistically to generate one or more statistical moments for that block.

The feature extract module 118 may operate on the envelopes of the respective signals (i.e. the estimated transfer function $\hat{h}(n)$; the estimated ultrasonic return signal $\hat{y}(n)$; and the error signal e(n)), calculating the statistical moments based on the envelopes rather than the amplitudes.

The statistical moments calculated for each signal may be the first moment (akin to the mean value of the nth data block, indicative of the central tendency of the data distribution); the second moment (akin to the variance of the nth data block, indicative of the width of the data distribution); the third moment (akin to the skewness of the nth data block, indicative of the asymmetry of the data distribution); or the fourth moment (akin to the kurtosis of the nth data block, indicative of the peakedness of the data distribution). In one embodiment, the feature extract module 118 may extract first, second, third and fourth statistical moments from each signal.

Further, the feature extract module 118 may be operative to determine other statistical measures. Conventional acoustic feature extraction schemes like Mel-frequency cepstral coefficients (MFCC), linear frequency cepstral coefficients (LFCC), linear predictive cepstral coefficients (LPCC) or similar can be used in addition or instead.

Figure 3:
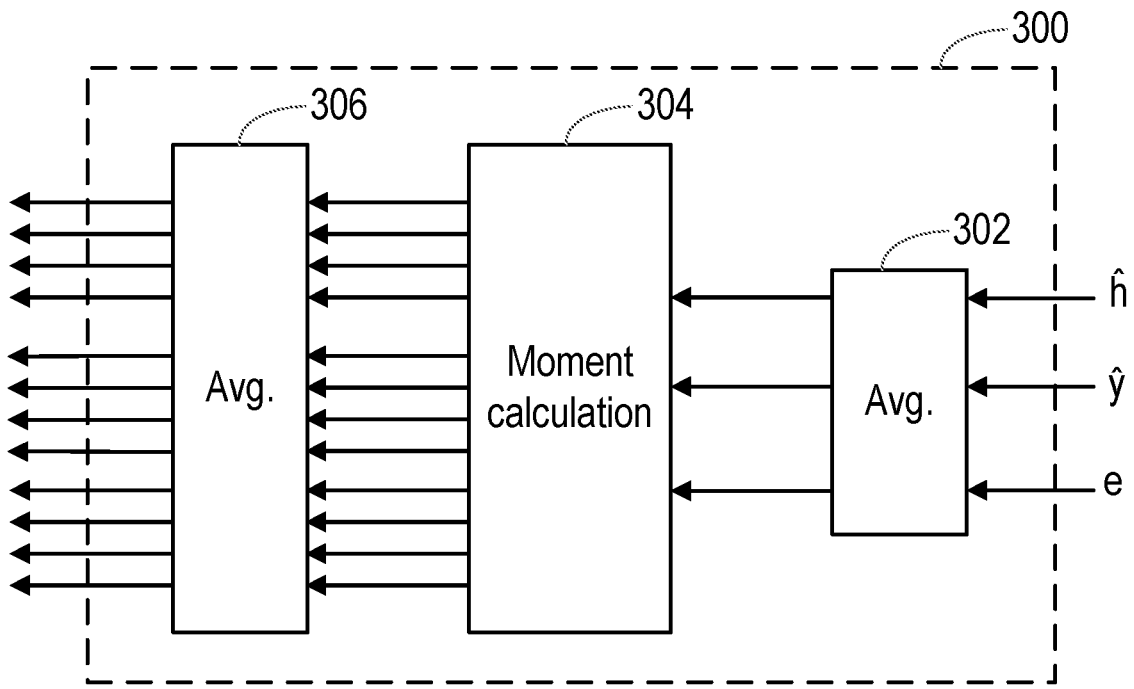
FIG. 3 is a schematic diagram of a feature extract module according to embodiments of the disclosure.

FIG. 3 is a schematic diagram of a feature extract module 300 according to embodiments of the disclosure. The feature extract module 300 may be implemented as the feature extract module 118 described above with respect to FIG. 1.

The feature extract module 300 comprises a first averaging module 302, a moment calculation module 304, and a second averaging module 306. It will be noted that the flow of data processing in FIG. 3 is from right to left, in accordance with the flow illustrated in FIG. 1.

In the illustrated embodiment, the feature extract module 300 receives the estimated transfer function $\hat{h}(n)$, the estimated ultrasonic return signal $\hat{y}(n)$, and the error signal e(n). It will be apparent from the discussion above that, in other embodiments, only one or more of these signals may be received.

The first averaging block 302 averages the received signals over a plurality of data blocks (e.g., four blocks), in order to reduce noise in the estimated values. The moment calculation module 304 calculated the statistical moments of the averaged values output from the block 302. These statistical moments, or features, are computed for the nth data block. Thus, features for the estimated ultrasonic return signal $\hat{y}(n)$ and the error signal e(n) are calculated over the number of data samples in the data block (e.g., 4096 samples), while features for the estimated transfer function $\hat{h}(n)$ are calculated over the number of taps of the adaptive filter 114 (e.g. 128).

As noted above, the statistical moments may be calculated on the basis of the envelopes of the respective signals. For example, the first to fourth statistical moments may be calculated as follows:

Mean $$\mu = \sum_{i=0}^{N-1} Z_i \cdot P_{Z_i}$$

Standard deviation $$s = \sum_{i=0}^{N-1} \frac{(Z_i - \mu)^3}{\sigma^3} \cdot P_{Z_i}$$

Skewness $$k = \sum_{i=0}^{N-1} \frac{(Z_i - \mu)^4}{\sigma^4} \cdot P_{Z_i}$$

Kurtosis $$\sum_{i=0}^{N-1} P_{Z_i} = 1,$$

where $Z_i$ is the ith sample position of a total of N samples and $P_{Z_i}$ is the probability density function at $Z_i$. The probability density function may be defined as the envelopes of the signals normalized such that $$\sigma^2 = \sum_{i=0}^{N-1} (Z_i - \mu)^2 \cdot P_{Z_i}$$

where the envelopes may be calculated using the Taeger-Kaiser method (or any other suitable method).

The output of the moment calculation module 304 is thus one or more calculated statistical moments. In the illustrated embodiment, first to fourth statistical moments are calculated for each of the estimated transfer function $\hat{h}(n)$, the estimated ultrasonic return signal $\hat{y}(n)$, and the error signal e(n), and therefore the moment calculation module 304 outputs twelve statistical moments.

The second averaging block 306 receives the statistical moment(s), and averages them over a plurality of data blocks (e.g., 20 blocks) in order to smoothen variation in the statistical moments from block to block.

Returning to FIG. 1, the calculated statistical moments are output to a classifier module 120, which is operative to determine the presence of a nearby object based on the calculated statistical moments. The calculated statistical moments may be considered as a vector of extracted features, also called a "feature vector" herein. Thus, the feature vector for the nth data block may comprise up to twelve parameters as follows:

- $\{F_{1,n}, F_{2,n}, F_{3,n}, F_{4,n}\}$: the first four moments of the envelope distribution of the estimated transfer function $\hat{h}(n)$;
- $\{F_{5,n}, F_{6,n}, F_{7,n}, F_{8,n}\}$: the first four moments of the envelope distribution of the estimated ultrasonic return signal $\hat{y}(n)$;
- $\{F_{9,n}, F_{10,n}, F_{11,n}, F_{12,n}\}$: the first four moments of the envelope distribution of the error signal e(n).

In one embodiment, the classifier module 120 is operative to classify the feature vector for each data block into one of a plurality of classifications. The plurality of classifications may comprise at least a first classification indicating the presence of a nearby object and a second classification indicating the absence of a nearby object. In this way, the classifier module 120 may provide a binary output indicating the presence or absence of a nearby object. In further embodiments, the plurality of classifications may comprise additional classifications for different scenarios. For example, the plurality of classifications may comprise multiple classifications indicating the presence of an object at multiple, different distances from the device 100. For example, the plurality of classifications may comprise classifications which take account of an angle of orientation of the nearby object with respect to the electronic device. In this case, the classifier module 120 may be able to distinguish between situations in which the electronic device 100 is held parallel to the user's ear (for example), and in which the electronic device 100 is held at a skewed angle to the user's ear.

Figure 4:
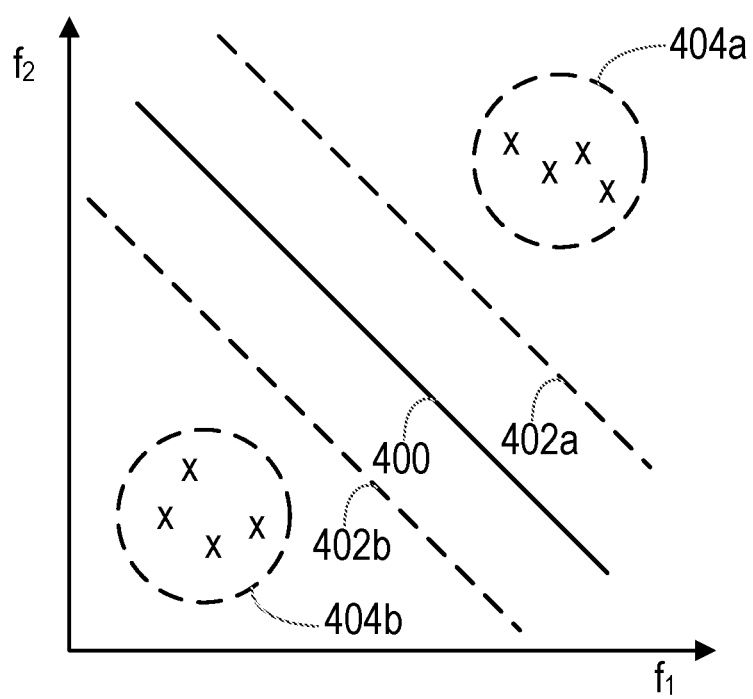
FIG. 4 illustrates classification of a feature vector according to embodiments of the disclosure.

FIG. 4 illustrates classification of a feature vector according to embodiments of the disclosure. The illustration is limited to classification based on two features, $F_1$ and $F_2$, owing to the limitations of the printed medium; however, those skilled in the art will appreciate that the concept may be extended to more than two dimensions.

Crosses in the illustrated graph represent feature vectors for particular data blocks. The crosses fall on either side of a line (or, in general, a hyperplane) 400, which thus serves to classify the crosses into one of two classifications 404a, 404b in the illustrated embodiment. The hyperplane may be found by a machine-learning algorithm, based on training data comprising known samples for the different classifications (e.g., the presence or absence of a nearby object, etc). In one example, the classifier module 120 implements a support vector machine (SVM).

Thus, the classifier module 120 may classify a data block based on the relationship between the feature vector for that data block and the hyperplane.

The hyperplane 400 may be configured with a level of hysteresis, to prevent rapid switching between classifications when feature vectors fall close to the hyperplane. In the illustrated embodiment, two further hyperplanes 402a, 402b are defined on either side of the hyperplane 400. Where a feature vector falls between the two hyperplanes 402a, 402b, the classifier module 120 maintains the classification from a previous data block.

Consider an example in which the feature vector for the nth data block falls within a first classification 404a, indicating the absence of a nearby object. The feature vector for the (n+1)th data block falls on the other side of the first hyperplane 402a, and may even fall on the other side of the hyperplane 400. However, it is not classified within a second classification 404b unless it also crosses the second hyperplane 402b. Thus the classification of consecutive data blocks should not change rapidly, even in cases where the feature vectors fall close to the hyperplane 400.

Returning to FIG. 1, the classification for the data block is output from the processing circuitry 102. For example, the classification may be output to further processing circuitry of the device 100 (not illustrated), such as a general-purpose or applications processor for further handling (e.g., locking of a touchscreen, generation of an alert signal, etc.).

In the illustrated embodiment, the processing circuitry 102 further comprises a first ratio module 122 coupled in parallel with the high-pass filter 110 (i.e. with separate inputs coupled to the input and the output of the high-pass filter 110). The first ratio module 122 is operative to determine a ratio of out-of-band energy to in-band energy (or out-of-band energy to total energy), and thus determine a level of noise in the ultrasonic return signal detected by the microphone 106. If the ratio is above a threshold for a data block (i.e., the noise is too high), the corresponding data block may not be used in the proximity detection process. For example, the data block may be discarded without further processing (e.g. in the adaptive filter 114 or the feature extract module 118), or the results of that processing may be ignored or discarded. In this way, poor-quality data is not relied upon to detect nearby objects.

The processing circuitry 102 also comprises a second ratio module 124 coupled in parallel with the filter 114. The second ratio module 124 is operative to determine a ratio of the root mean square deviation of e(n) to the root mean square deviation of Y(n). If the ratio is above a threshold for a data block (i.e., the error is too high), the corresponding data block may not be used in the proximity detection process. For example, the data block may be discarded without further processing (e.g. in the feature extract module 118), or the results of that processing may be ignored or discarded. In this way, similarly to the first ratio module, poor-quality data is not relied upon to detect nearby objects.

Embodiments of the present disclosure thus provide apparatus, systems and methods for proximity detection using ultrasonic signals. Processing of the signals is robust to noise, and has the potential to classify detected signals into a plurality of different classifications.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. A module may itself comprise other modules or functional units.

This software code may be stored in the device as firmware on some non-volatile memory e.g. EEPROM (to preserve program data when the battery becomes discharged or is removed for replacement).

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. A method of performing proximity detection, comprising:
   receiving an indication of an interrogating ultrasonic signal;
   receiving a detected ultrasonic return signal;
   estimating a transfer function between the interrogating ultrasonic signal and the detected ultrasonic return signal;
   calculating a fourth statistic moment of an error signal, representing the error between the estimated ultrasonic return signal and the detected ultrasonic return signal; and
   determining the presence of a nearby object based on the statistical moments.

2. A computer program product, comprising a non-transitory machine-readable medium containing instructions which, when executed by processing circuitry, cause the processing circuitry to:
   receive an indication of an interrogating ultrasonic signal;
   receive a detected ultrasonic return signal;
   estimate a transfer function between the interrogating ultrasonic signal and the detected ultrasonic return signal;
   calculate a fourth statistic moment of an error signal, representing the error between the estimated ultrasonic return signal and the detected ultrasonic return signal; and
   determine the presence of a nearby object based on the statistical moments.

3. Processing circuitry for ultrasonic proximity-detection, comprising:
   a first input for receiving an indication of an interrogating ultrasonic signal;
   a second input for receiving a detected ultrasonic return signal;
   an adaptive filter, coupled to the first and second inputs, operative to estimate a transfer function between the interrogating ultrasonic signal and the detected ultrasonic return signal;
   a feature extract module, coupled to the adaptive filter, operative to calculate a fourth statistical moment of an error signal, representing the error between the estimated ultrasonic return signal and the detected ultrasonic return signal; and a classifier module, coupled to the feature extract module, operative to determine the presence of a nearby object based on the calculated fourth statistical moment.

4. The processing circuitry according to claim 3, wherein the classifier module is operative to classify a vector comprising the statistical moments into one of a plurality of classifications, the plurality of classifications comprising at least a first classification indicating the presence of a nearby object and a second classification indicating the absence of a nearby object.

5. The processing circuitry according to claim 4, wherein the classifier module is operative to determine a hyperplane between the plurality of classifications.

6. The processing circuitry according to claim 5, wherein the classifier module is operative to determine the hyperplane based on a machine-learning algorithm.

7. The processing circuitry according to claim 5, wherein the hyperplane is configured with one or more hysteresis functions, configured such that a vector comprising the statistical moments positioned within the hyperplane, as defined by the hysteresis functions, does not change a current classification.

8. The processing circuitry according to claim 3, wherein the classifier module comprises a support vector machine.

9. The processing circuitry according to claim 3, wherein the feature extract module is operative to calculate one or more of first, second, third and fourth statistical moments of one or more of the estimated transfer function, the estimated ultrasonic return signal and the error signal.

10. The processing circuitry according to claim 3, wherein the feature extract module is operative to calculate first, second, third and fourth statistical moments of one or more of the estimated transfer function, the estimated ultrasonic return signal and the error signal.

11. The processing circuitry according to claim 3, wherein the feature extract module is operative to calculate statistical moments of each of the estimated transfer function, the estimated ultrasonic return signal and the error signal.

12. The processing circuitry according to claim 3, wherein the feature extract module is operative on an envelope of one or more of the estimated transfer function, the estimated ultrasonic return signal and the error signal.

13. The processing circuitry according to claim 3, further comprising:
a high-pass filter coupled between the second input and the adaptive filter; and
a first ratio module, coupled in parallel with the high-pass filter, operative to determine a ratio of out-of-band energy to in-band energy in the detected ultrasonic return signal,
wherein statistical moments are discarded or not calculated for blocks of data samples in the detected ultrasonic return signal having a ratio of out-of-band energy to in-band energy which is above a threshold.

14. The processing circuitry according to claim 3, further comprising a second ratio module, coupled in parallel with the adaptive filter, operative to determine a ratio of a root mean square deviation of the error signal to a root mean square deviation of the detected ultrasonic return signal, wherein statistical moments are discarded or not calculated for blocks of data samples in the detected ultrasonic return signal having a ratio of the root mean square deviation of the error signal to the root mean square deviation of the detected ultrasonic return signal which is above a threshold.

15. The processing circuitry according to claim 3, further comprising an averaging module coupled between the second input and the adaptive filter, wherein the averaging module is operative to average data sample values over a plurality of successive blocks of the detected ultrasonic return signal, each block comprising a plurality of data samples.

16. The processing circuitry according to claim 3, further comprising a signal-generation module for generating the interrogating ultrasonic signal.

17. The processing circuitry according to claim 3, wherein the processing circuitry is provided on a single integrated circuit.

18. An electronic device, comprising:
processing circuitry according to claim 3; and
one or more ultrasonic transducers, coupled to the processing circuitry, operative to generate the interrogating ultrasonic signal and to detect the ultrasonic return signal.

19. The electronic device according to claim 18, wherein the one or more ultrasonic transducers comprise a first transducer operative to generate the interrogating ultrasonic signal and a second transducer operative to detect the ultrasonic return signal.

20. The electronic device according to claim 18, comprising a smartphone, motion sensor, camera, monitor, laptop or tablet computer, or games console.

* * * * *